(12) United States Patent
Pabst et al.

(10) Patent No.: US 11,632,969 B2
(45) Date of Patent: Apr. 25, 2023

(54) COLD COFFEE BREWING SYSTEM AND METHOD

(71) Applicant: RONNOCO COFFEE, LLC, St. Louis, MO (US)

(72) Inventors: Dan Pabst, St. Louis, MO (US); Dan Janson, St. Louis, MO (US)

(73) Assignee: RONNOCO COFFEE, LLC, St. Louis, MO (US)

( * ) Notice: Subject to any disclaimer, the term of this patent is extended or adjusted under 35 U.S.C. 154(b) by 652 days.

(21) Appl. No.: 16/656,041

(22) Filed: Oct. 17, 2019

(65) Prior Publication Data

US 2020/0045989 A1 Feb. 13, 2020

Related U.S. Application Data

(63) Continuation of application No. 15/482,121, filed on Apr. 7, 2017, now Pat. No. 10,492,509.

(60) Provisional application No. 62/320,101, filed on Apr. 8, 2016.

(51) Int. Cl.
| | |
|---|---|
| *A23F 5/26* | (2006.01) |
| *A23L 2/72* | (2006.01) |
| *A23L 2/54* | (2006.01) |
| *A47J 31/44* | (2006.01) |

(52) U.S. Cl.
CPC ............... *A23F 5/26* (2013.01); *A23L 2/54* (2013.01); *A23L 2/72* (2013.01); *A47J 31/44* (2013.01); *A23V 2002/00* (2013.01)

(58) Field of Classification Search
CPC .......... A47J 31/002; A47J 31/24; A47J 31/44; A47J 31/467; A47J 31/469; A23F 5/26; A23L 2/54; A23L 2/72; A23V 2002/00
See application file for complete search history.

(56) References Cited

U.S. PATENT DOCUMENTS

| | | | | |
|---|---|---|---|---|
| 4,653,388 | A * | 3/1987 | Wilkinson | C12C 7/22 426/16 |
| 4,786,519 | A * | 11/1988 | Gupta | A23L 2/54 426/106 |
| 2011/0014339 | A1 * | 1/2011 | Stahl | F25D 31/005 99/290 |
| 2018/0098658 | A1 * | 4/2018 | Angell | A47J 31/44 |

* cited by examiner

*Primary Examiner* — Dana Ross
*Assistant Examiner* — Joe E Mills, Jr.
(74) *Attorney, Agent, or Firm* — The Small Patent Law Group LLC; Christopher R. Carroll

(57) ABSTRACT

A coffee brewing system and method brew hot coffee at an elevated temperature by mixing coffee grounds with hot water, filtering the hot coffee to remove at least some of the coffee grounds from the hot coffee to form filtered hot coffee, and rapidly cooling the filtered hot coffee to reduce a temperature of the filtered hot coffee to form cooled coffee. The coffee optionally may be mixed with a gas, such as nitrogen, prior to serving the cooled coffee. The system and method can rapidly produce cold coffee in large amounts without diluting the coffee in water or ice, or waiting for the coffee to cool in a refrigerated environment.

9 Claims, 2 Drawing Sheets

COLD COFFEE BREWING SYSTEM AND METHOD

CROSS-REFERENCE TO RELATED APPLICATIONS

This application is a continuation of U.S. patent application Ser. No. 15/482,121, which was filed on 7 Apr. 2017, and claims priority to U.S. Provisional Application No. 62/320,101, filed on 8 Apr. 2016. The entire disclosures of these applications are incorporated herein by reference.

BACKGROUND

Technical Field

Embodiments of the present disclosure generally relate to systems and methods for brewing coffee.

Discussion of Art

Coffee can be consumed as a hot or cold beverage. In order to produce cold coffee (e.g., coffee that is cooled below room temperature, such as to a temperature that is no greater than 40 degrees Fahrenheit), a variety of known techniques may be used. A cold brewing technique involves grinding coffee beans and placing the ground coffee beans into cold or room temperature water for a prolonged period of time. Typically, the coffee grounds are placed into the water for twelve hours or more. The coffee grounds are filtered out of the water and coffee that is either cool or at room temperature is produced. Because of the prolonged time needed for brewing the coffee using this technique, however, cold brewing may not be suitable for many applications. Additionally, because coffee beans include components such as caffeine, oils, and fatty acids that are more soluble at elevated temperatures but less soluble or insoluble at the temperatures at which the coffee is brewed using the cold brewing technique, the flavor profile of coffee produced using the cold brewing technique may not be desirable to many consumers.

Another technique for producing cold coffee is to brew hot coffee and then add ice to the hot coffee to cool the coffee to a lower temperature. This technique results in the coffee becoming diluted, which may not be desired by many consumers. Additionally, control over the flavor profile of the coffee can be difficult due to the inability to accurately control the amount of dilution of the coffee on a repeated basis.

Another technique for producing cold coffee is to brew hot coffee and then cool the coffee, such as by placing the coffee in a refrigerated container. One problem with this technique is that the time required to cool the coffee can be considerable. The longer the time period needed to cool the coffee, the more the coffee may oxidize. The oxidized coffee can provide a taste that is undesirable to many consumers.

BRIEF DESCRIPTION

In one embodiment, a system (e.g., a brewing system) includes a brewing tank configured to receive coffee grounds and hot water (where the coffee grounds are mixed with the hot water at an elevated temperature to brew hot coffee, one or more filters configured to filter the hot coffee to remove at least some of the coffee grounds from the hot coffee to form filtered hot coffee, and a heat exchanger configured to rapidly cool the filtered hot coffee to reduce a temperature of the filtered hot coffee to form cooled coffee.

In one embodiment, a method (e.g., for brewing cold coffee) includes brewing hot coffee at an elevated temperature by mixing coffee grounds with hot water, filtering the hot coffee to remove at least some of the coffee grounds from the hot coffee to form filtered hot coffee, and rapidly cooling the filtered hot coffee to reduce a temperature of the filtered hot coffee to form cooled coffee.

In one embodiment, a method includes brewing hot coffee by mixing coffee grounds with water at a temperature of at least 180 degrees Fahrenheit, filtering the hot coffee through multiple filters to remove at least some of the coffee grounds from the hot coffee to form filtered hot coffee, and cooling the filtered hot coffee from the temperature of at least 180 degrees Fahrenheit to a temperature no warmer than forty degrees Fahrenheit within a time period no longer than twenty minutes to form cooled coffee.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
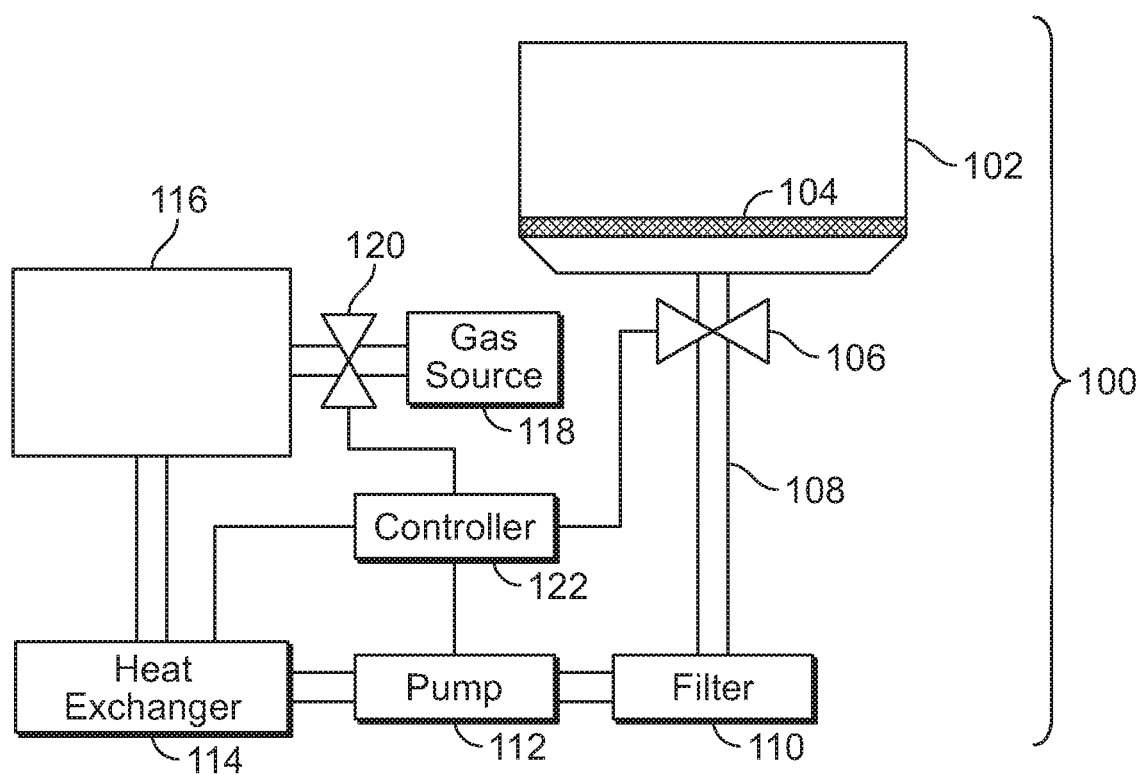
FIG. 1 one embodiment of a brewing system for producing cold coffee.

FIG. 1 one embodiment of a brewing system 100 for producing cold coffee. The brewing system 100 is used to generate cold coffee within a relatively short time period without diluting the coffee or allowing the coffee to oxidize. As a result, the end product is cooled coffee produced in a short period of time and having a flavor profile that is the same as or closer to hot coffee than cold coffee brewed by other techniques. In one embodiment, the brewing system 100 can generate a large amount of cold coffee within a short time period, such as at least 35 gallons of cold coffee, at least 75 gallons of cold coffee, up to 150 gallons of cold coffee, up to 1,500 gallons of cold coffee, or another amount, within twenty minutes (or another period of time). Optionally (and as described below), the brewing system 100 may add a gas to the cold coffee, such as nitrogen, after brewing.

The brewing system 100 includes a brewing tank 102, such as a lauter tun or other container, that holds a filter body 104. The brewing tank 102 forms an enclosure in which heated water is mixed with coffee grounds to brew hot coffee. In one embodiment, water is preheated in another tank and transferred to the brewing tank 102. Alternatively, the water may be heated in the brewing tank 102. For example, the brewing tank 102 may include one or more heating elements, or bodies that become heated and thereby heat the water in the tank 102.

The water may be heated to an elevated temperature suitable for brewing coffee. In one embodiment, the water is heated to a temperature of 200 degrees Fahrenheit (or 93.3 degrees Celsius). Alternatively, the water may be heated to a temperature of 198 to 202 degrees Fahrenheit (or 92.2 to 94.4 degrees Celsius), inclusive of 198 and 202 degrees Fahrenheit. In another embodiment, the water may be heated to a temperature between 195 to 205 degrees Fahrenheit (or 90.6 to 96.1 degrees Celsius), inclusive of 195 and 205 degrees Fahrenheit. In another embodiment, the water may be heated to a temperature between 190 to 210 degrees Fahrenheit (or 87.8 to 98.9 degrees Celsius), inclusive of 190 and 210 degrees Fahrenheit. Optionally, another elevated temperature (e.g., above room temperature) may be used.

Some, but not all, of the heated water used for brewing coffee using the system 100 during the brewing of a single batch of coffee may be mixed with coffee grounds in the brewing tank 102. The amount of heated water that is equivalent to one third of the total amount of water used to brew coffee in a single batch may be added to the brewing tank 102. Alternatively, another amount of heated water may be added to the brewing tank 102. For example, if seventy-five gallons of water are to be used in brewing coffee during a single batch, then twenty-five gallons (or ninety-five liters) of heated water can be in the tank 102. Alternatively, another amount of heated water can be added to the tank 102, such as fifty gallons (or 190 liters) of water (e.g., when 150 gallons or 570 liters of water are used to brew coffee), 500 gallons (or 1900 liters) of water (e.g., when 1500 gallons or 5700 liters of water are used to brew coffee), or another amount can be added to the tank 102.

The coffee grounds may be relatively large size. For example, coffee beans may be ground such that, when the coffee grounds are passed through a ROTAP device, 69-75% of the coffee grounds are collected in US Standard Size #20 and #30 sieves, 25-28% of the coffee grounds are collected in US Standard Size #12 and #16 sieves, and 10-14% of the coffee grounds pass through a US Standard Size #30 sieve and into a pan or other collection device. Alternatively, the coffee grounds may be a smaller size.

Coffee grounds are introduced into the heated water in the brewing tank 102 to begin brewing hot coffee. In one embodiment, sixty pounds (or twenty-seven kilograms) of ground coffee beans are mixed into twenty-five gallons (or ninety-five liters) of heated water in the tank 102. Alternatively, a greater or lesser amount of coffee grounds may be mixed with a greater or lesser amount of heated water. The amount of coffee grounds may be based on the amount of coffee to be brewed. For example, the amount of coffee grounds may increase with larger batches of coffee being brewed, and can decrease with smaller batches of coffee being brewed. The ratio of weight of heated water to coffee grounds used to brew the coffee may be a 10:1 ratio (e.g., seventy-five gallons of heated water and sixty pounds of ground coffee) in one embodiment. Alternatively, another ratio of heated water to may be used. For example, a ratio of at least 12:1 to no more than 8:1 may be used, a ratio of at least 11:1 to no more than 9:1 may be used, or another ratio may be used.

The coffee grounds are agitated in the heated water in the tank 102 in one embodiment. This agitation may be performed manually, such as by an operator of the system 100 moving a paddle or other object in the tank 102 to agitate the coffee grounds. Alternatively, the agitation may be performed automatically or by machine implementation, such as by one or more motors moving one or more paddles within the tank 102.

Additional heated water is added to the tank 102 in one embodiment. The remaining amount of water used to brew the batch of coffee may be added. For example, if the amount of heated water that equals one third of the total amount of water to be used in brewing coffee is already in the tank 102, then an amount of heated water that equals two thirds of the total amount of water to be used in brewing the coffee can be added to the tank 102. Agitation of the coffee grounds in the water in the tank 102 can occur while the remaining heated water is introduced into the tank 102.

The coffee grounds remain in contact with the heated water in the brewing tank 102 for a brewing time. This brewing time can vary to achieve different flavors of coffee, can vary based on the amount of coffee grounds in the brewing tank 102, and/or can vary based on the amount of heated water in the brewing tank 102. In one embodiment, the coffee grounds remain in contact with the heated water in the brewing tank 102 for a time period of at least fifteen minutes and no more than twenty minutes. Alternatively, a shorter or longer time period may be used. This time period may be referred to as a contact time.

Once the brewing time is complete, a drain valve 106 opens. The drain valve 106 controls flow of the coffee brewed in the tank 102 (referred to as hot coffee or hot brewed coffee) through one or more conduits 108 in the system 100. A first portion of the conduits 108 fluidly couples the brewing tank 102 with a filter 110.

Responsive to opening the drain valve 106, the hot brewed coffee drains from the brewing tank 102 and flows through the first portion of the conduits 108 to the filter 110. The filter 110 may be referred to as an in-line filter. The hot brewed coffee can flow through the filter body 104, where at least some of the coffee grounds introduced into the brewing tank 102 are filtered or otherwise removed from the hot brewed coffee. The filter body 104 may be a metal filter or another type of filter. The coffee passing through the filter body 104 may include some additional coffee grounds, which are removed from the hot brewed coffee by the filter 110. The hot brewed coffee flows through the filter 110 to remove remaining coffee grounds. The filter 110 may be a centrifugal filter or another type of filter. In one embodiment, the filter 110 is a twenty inch (or fifty-one centimeter) inline filter with a metal wedge wire micron 127 filter. Alternatively, another type of filter may be used.

A pump 112 generates a suction force in the conduits 108 to draw the hot brewed coffee through the conduits 108. The pump 112 can pull on the hot brewed coffee flowing out of the brewing tank 102 and through the filter 110. The coffee exiting the filter 110 can be referred to as filtered coffee. The pump 112 can direct the filtered coffee (which may remain at an elevated temperature, such as the temperature at which the coffee was brewed or slightly less, such as five to ten degrees Fahrenheit less) through a second portion of the conduits 108 to a heat exchanger 114.

With the storage tank 102 and the pump 112, a unique coffee brewing process is provided by the system 100. This brewing process includes a first stage, immersion type of coffee brewing, where the coffee grounds remain in contact with the heated water in the brewing tank 102 (e.g., with the drain valve 106 remaining closed) for a first designated period of time. This first designated period of time may be approximately six minutes in one embodiment. Alternatively, a different period of time may be used, such as between five and seven minutes. The brewing process includes a subsequent, second stage of pressure assisted drip type of coffee brewing. This stage involves the coffee dripping out of a bed of coffee grounds formed on the filter body 104 in the storage tank 102 into the first portion of the conduits 108. The coffee may be drawn through this bed of coffee grounds by the pressure or suction generated by the pump 112. This second stage of the brewing process can last for a different, second designated period of time. This second designated period of time may be approximately nine to fourteen minutes. For example, the second designated period of time may be at least nine minutes and no more than fourteen minutes. Alternatively, the second designated period of time may be different, such as at least eight minutes and no more than fifteen minutes, at least seven minutes and no more than sixteen minutes, or another period of time.

The heat exchanger 114 cools the filtered coffee to a designated reduced temperature. The heat exchanger 114 can be a plate-style heat exchanger that pumps water, glycol, or other fluids in channels that are separate from, but thermally coupled with, channels in the heat exchanger 114 through which the filtered coffee flows due to the pressure generated by the pump 112. This allows the heat exchanger 114 to cool the hot and filtered coffee without diluting the coffee or changing the chemical constituents of the coffee.

The heat exchanger 114 rapidly cools the filtered coffee in one embodiment. For example, the temperature of the filtered coffee may decrease by at least 160 degrees Fahrenheit (or seventy-one degrees Celsius), by at least 150 degrees Fahrenheit (or sixty-six degrees Celsius), by at least 125 degrees Fahrenheit (or fifty-two degrees Celsius), by at least 100 degrees Fahrenheit (or thirty-eight degrees Celsius), or by another amount. In one embodiment, the filtered coffee is cooled during flow of the filtered coffee through the heat exchanger 114 to a temperature of forty degrees Fahrenheit (or four degrees Celsius). Alternatively, the filtered coffee may be cooled to another temperature, such as between thirty-eight and forty-two degrees Fahrenheit or three to six degrees Celsius, inclusive; between thirty-six and forty-four degrees Fahrenheit or two to seven degrees Celsius, inclusive; or another temperature. The filtered coffee is cooled rapidly and faster than the coffee would be cooled by storing the filtered coffee in a standard home refrigerator overnight or by pouring the coffee over ice. For example, filtered coffee may be cooled to the designated temperature in less than twenty minutes, less than fifteen minutes, less than ten minutes, or less than five minutes, depending on the heat exchanger 114 (e.g., the size of the heat exchanger 114). Keeping the total time for producing the cooled coffee relatively short can reduce the total contact time of the water and coffee with the coffee grounds. Allowing the water and coffee to remain in contact with the coffee grounds for longer time periods can significantly deteriorate the taste of the end result coffee, such as by producing a more bitter coffee than is achieved by shorter contact times between the coffee grounds and the water or coffee. Additionally, once the filtered coffee leaves the brewing tank 102, the system 100 may provide a sealed environment that does not expose the coffee to the ambient environment and/or oxygen until after the coffee is removed from the system 100. This also can assist in producing a coffee having an improved flavor profile relative to coffee that is exposed to the ambient environment and/or oxygen during cooling or storage.

The filtered coffee may be cooled without freezing or partially freezing the coffee, so that the cooled coffee exiting the heat exchanger 114 can continue to flow through a third portion of the conduits 108 to a storage tank 116. In one embodiment, the storage tank 116 can be referred to as a brite tank or bright tank. The cooled coffee is directed into the storage tank 116 by the pressure generated by the pump 112. The time period between placing the coffee grounds into contact with the heated water in the brewing tank 102 to placing or directing the cooled and filtered coffee into the storage tank 116 may be relatively short, such as twenty minutes or less, thirty minutes or less, or another amount of time. This short time period for brewing, filtering, and rapidly cooling the hot coffee may be used for large volumes of coffee, such as seventy-five gallons, 150 gallons, 1500 gallons, etc. The cold coffee may be brewed hot, filtered, and then cooled while not diluting the coffee or having the coffee stored in an environment that causes oxidation of the coffee for an extended period of time (e.g., more than twelve hours). Subsequent to the immersion brewing process in the brewing tank 102, the system 100 may reduce or prevent contact between the coffee and one or more constituents in the ambient environment (e.g., oxygen) by sealing the components of the system 100 from the external environment, as described above. This can assist in preventing the coffee from oxidizing or otherwise being chemically altered during the process described herein.

In the illustrated embodiment, the storage tank 116 is fluidly coupled with a gas source 118. The gas source 118 can represent a tank of pressurized gas or a machine that generates the gas at an elevated pressure. Alternatively, the system 100 may not include the gas source 118. The gas source 118 can store a gas that is introduced into the storage tank 116 to be mixed with the cooled coffee. For example, the gas source 118 may include nitrogen gas. The nitrogen gas is held in the gas source 118 at a pressure of at least forty-five pounds per square inch (or at least 3.1 bar).

A valve 120 is closed to prevent the gas in the gas source 118 from flowing into the storage tank 116 and is opened to allow the gas in the gas source 118 to flow into the storage tank 116. In one embodiment, the valve 120 is open prior to the coffee being introduced into the storage tank 116 in order to introduce the gas in the tank 116. The storage tank 116 may be purged with the gas prior to transferring coffee into the tank 116 to achieve no less than 100 parts per billion of dissolved oxygen in the tank 116 at a pressure (or absence of pressure) of zero pounds per square inch. The gas can be introduced into the tank 116 at a pressure of at least fourteen pounds per square inch, at least 14.5 pounds per square inch, at least fifteen pounds per square inch, or another pressure. This introduction of the gas prior to entry of the coffee into the tank 116 can charge (or at least partially fill) the tank 116 with the gas and purge oxygen from the tank 116. The gas and cooled coffee may be in the storage tank 116 together in order to mix the gas with the cooled coffee. For example, nitrogen may be mixed in with the cooled coffee. Once the coffee is in the tank 116, the pressure of the gas is supplied into the storage tank 116 can be increased to an elevated pressure, such as at least forty-five pounds per square inch, in one embodiment. Alternatively, the gas can be supplied into the storage tank 116 at another pressure, such as at least fifty-five pounds per square inch, at least thirty pounds per square inch, and/or up to sixth pounds per square inch, or another pressure.

The gas may be supplied to the storage tank 116 for at least a designated period of time. Exposure of the coffee to the gas for such as extended period of time can assist in the coffee absorbing at least some of the gas while in the tank 116. In one embodiment, the gas is supplied to the storage tank 116 for at least twenty-four hours. Another time period alternatively may be used. In one embodiment, a carbonating or carbonation stone is placed inside the storage tank 116 while the gas is supplied to the storage tank 116. The carbonating or carbonation stone may be added to the storage tank 116 to decrease the time that the cooled coffee is held in the storage tank 116 before serving at least some of the cooled coffee to one or more consumers. For example, without the carbonating or carbonation stone, the cooled coffee may be in the storage tank 116 for twenty-four hours while the cooled coffee may be in the storage tank 116 for four hours.

In the illustrated embodiment, the system 100 includes a controller 122 that operates to control various components of the system 100. The controller 122 represents hardware circuitry that includes and/or is electrically connected with one or more processors (e.g., microprocessors, field programmable gate arrays, integrated circuits, or other electronic logic-based devices). The controller 122 is communicatively coupled with various components of the system 100 to allow the controller 122 to generate and communicate control signals that direct the components to implement various actions. For example, the controller 122 can be coupled with the drain valve 106, the pump 112, the heat exchanger 114, and/or the valve 120 by one or more wired and/or wireless connections over or through which the controller 122 can transmit and/or broadcast control signals to control operations of these components. Alternatively, the system 100 may not include the controller 122, or may include several controllers 122 that separately control operations of different components of the system 100.

The controller 122 can generate and communicate a control signal to the drain valve 106 to change a state of the drain valve 106. For example, the controller 122 can send the control signal to the drain valve 106 (or a motor or other device coupled with the drain valve 106) to open the drain valve 106 or to close the drain valve 106. The controller 122 may thereby control when the drain valve 106 is open or closed.

The controller 122 can generate and communicate a control signal to the pump 112 to activate or deactivate the pump 112. For example, the controller 122 can send the control signal to the pump 112 (or a motor or other device of the pump 112) to turn on the pump 112 and cause the pump 112 to begin generating suction or other forces that move the coffee through the system 100 or to turn the pump 112 off and stop the pump 112 from generating suction or other forces that move the coffee through the system 100.

The controller 122 can generate and communicate a control signal to the heat exchanger 114 to activate or deactivate the heat exchanger 114. For example, the controller 122 can send the control signal to the heat exchanger (or a motor or other device of the heat exchanger 114) to turn on the heat exchanger 114 and cause the heat exchanger 114 to begin cooling the coffee or to turn the heat exchanger 114.

The controller 122 can generate and communicate a control signal to the valve 120 to change a state of the valve 120. For example, the controller 122 can send the control signal to the valve 120 (or a motor or other device coupled with the valve 120) to open the valve 120 or to close the valve 120. The controller 122 may thereby control when the valve 120 is open or closed to control the flow of gas in the gas source 118 into the storage tank 116.

Figure 2:
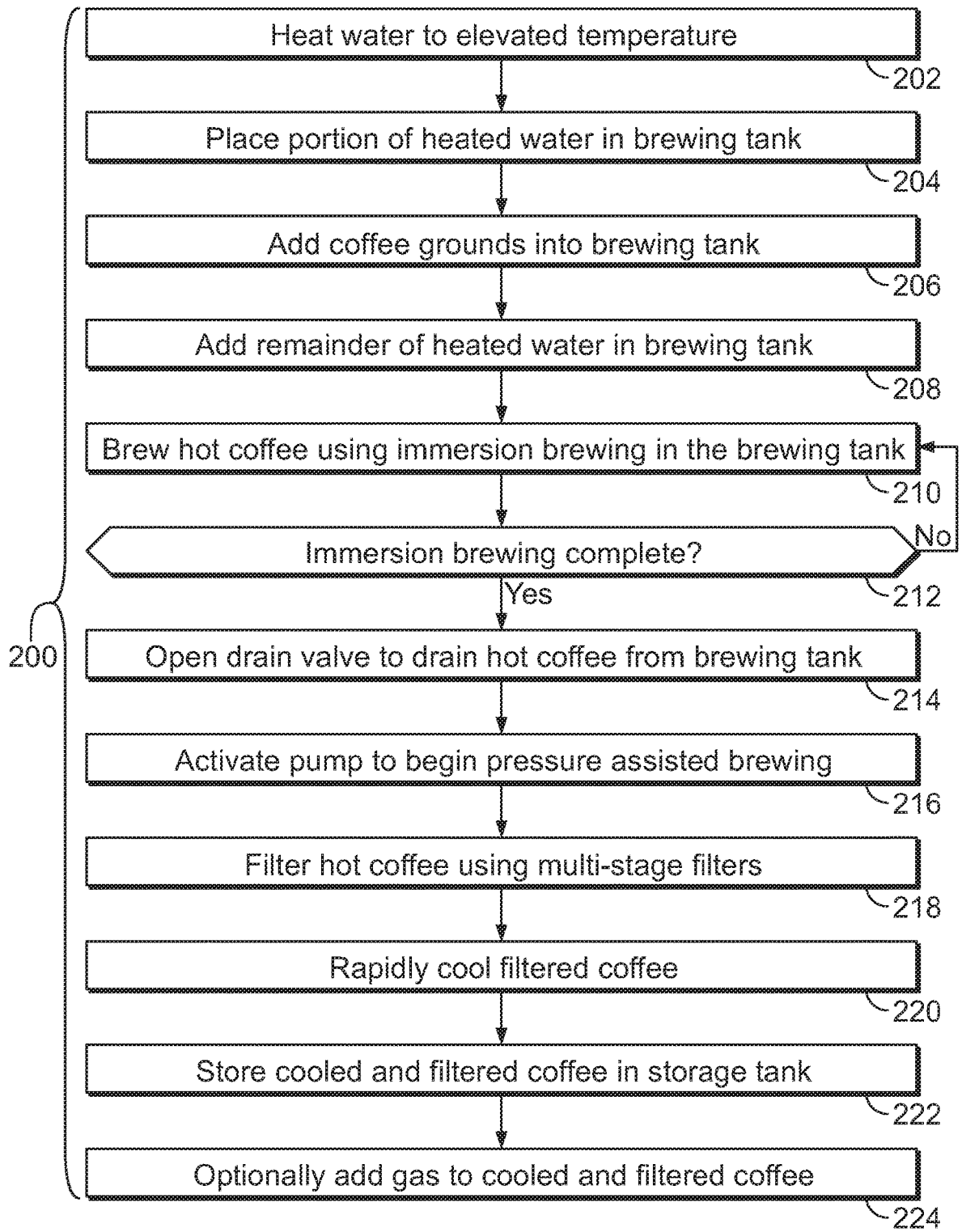
FIG. 2 illustrates a flowchart of one embodiment of a method for brewing cold coffee.

FIG. 2 illustrates a flowchart of one embodiment of a method 200 for brewing cold coffee. The method 200 can be performed by the system 100 described herein to brew cold coffee in large amounts within a short time period without diluting the coffee or changing flavor of the hot coffee that is initially brewed (e.g., through oxidation). Optionally, the method 200 can represent an algorithm that is a software program or that is used to program one or more of the components of the system 100 to brew the cold coffee.

At 202, water is heated to an elevated temperature. As one example, the water can be heated to 200 degrees Fahrenheit or approximately 200 degrees Fahrenheit, as described above. The water can be heated in the brewing tank 102 or in another location. At 204, a portion (and less than all) of the heated water is placed into the brewing tank. For example, one third of the total water used to brew a single batch of coffee (e.g., the 75 gallons, 150 gallons, 1500 gallons, or other amount) may be adding to the brewing tank 102. At 206, coffee grounds are added to the heated water in the brewing tank 102. At 208, the remainder of the heated water is added to the brewing tank 102. During and/or after addition of the coffee grounds and water to the brewing tank 102, the mixture of the coffee grounds and the water may be agitated, as described above.

At 210, hot coffee is brewed in the brewing tank 102 using immersion brewing. During this brewing, the water and coffee grounds remain in the brewing tank 102 so that the coffee grounds remain in contact with the heated water. At 212, a determination is made as to whether the immersion brewing of the coffee in the brewing tank 102 is complete. If the immersion brewing is complete (e.g., the coffee grounds have been in contact with the heated water for a designated time period, as described above), then flow of the method 200 can proceed toward 214. Otherwise, flow of the method 200 can return toward 210 so that immersion brewing can continue until complete.

At 214, a drain valve is opened in order to drain the hot coffee from the brewing tank 102. The coffee drained from the brewing tank 102 is heated. For example, the coffee may be at an elevated temperature (e.g., above room temperature, above 100 degrees Fahrenheit, above 150 degrees Fahrenheit to 205 degrees Fahrenheit, or another range of acceptable brewing temperatures) as the coffee drains from the brewing tank 102. At 216, a pump is activated to force the heated coffee through one or more conduits. The pump may be activated to being pressure assisted drip brewing of the coffee from the brewing tank 102. The pump may be activated at the same time that the drain valve is opened, after the drain valve is opened, or prior to opening the drain valve in different embodiments.

At 218, the hot coffee in the brewing tank 102 is filtered using multiple stage filters. For example, the hot coffee in the brewing tank 102 may be drained from the brewing tank 102 through the filter body 104 in the brewing tank 102 and then filtered again using the inline filter 110. Alternatively, the hot coffee may be filtered using more than two filters or using a single filter.

At 220, the coffee is rapidly cooled. The coffee can be cooled after the coffee has been filtered, as described above. Alternatively, the coffee can be cooled prior to filtering the coffee or between filters of a multi-stage filtering process. The coffee may be cooled within a relatively short time period without diluting or chemically altering the coffee, in contrast to cooling techniques involving mixing the coffee with ice, allowing the coffee to slowly cool (thereby resulting in oxidation), etc. The coffee can be cooled by flowing the coffee through one or more heat exchangers.

At 222, the cooled and filtered coffee is stored in the storage tank 116. The coffee can be stored in the storage tank 116 for at least a designated time period (e.g., twenty-four hours), or may be immediately available for consumption following completion of the brewing of the batch of coffee (where the batch is completed when the water mixed with the coffee in the brewing tank 102 has reached the storage tank 116). The storage tank 116 may be sealed to reduce or eliminate contact between the coffee and the external environment to reduce or eliminate oxidation or other chemical changes to the coffee. As described above, the tank 116 may be purged with the gas (e.g., nitrogen) to remove oxygen from the tank 116, the coffee may then be introduced into the tank 116, and the pressure of the gas can be increased to the head pressure to cause the gas to be absorbed in the coffee in the tank 116.

At 224, the coffee optionally may be mixed with a gas. For example, nitrogen can be directed into the storage tank 116 to mix with the coffee while the coffee is stored in the storage tank 116. The mixture of coffee and the gas can provide a pleasant or desired taste to at least some consumers.

In one embodiment, a method (e.g., for brewing cold coffee) includes brewing hot coffee at an elevated temperature by mixing coffee grounds with hot water, filtering the hot coffee to remove at least some of the coffee grounds from the hot coffee to form filtered hot coffee, and rapidly cooling the filtered hot coffee to reduce a temperature of the filtered hot coffee to form cooled coffee.

In one example, brewing the hot coffee includes mixing the coffee grounds with the hot water at a temperature above room temperature.

In one example, brewing the hot coffee includes mixing the coffee grounds with the hot water at a temperature of at least 180 degrees Fahrenheit.

In one example, brewing the hot coffee includes mixing the coffee grounds with the hot water at a temperature of at least 200 degrees Fahrenheit.

In one example, brewing the hot coffee includes adding a first portion of a total amount of the hot water to be used to produce the cooled coffee to a brewing tank, subsequently adding the coffee grounds to the brewing tank, and adding a remaining portion of the total amount of the hot water to be used to produce the cooled coffee to the brewing tank.

In one example, brewing the hot coffee, filtering the hot coffee, and rapidly cooling the filtered hot coffee produces a batch amount of cooled coffee, where the batch amount of cooled coffee is at least seventy-five gallons of the cooled coffee.

In one example, the batch amount of cooled coffee is at least 150 gallons of the cooled coffee.

In one example, the batch amount of cooled coffee is at least 1,500 gallons of the cooled coffee.

In one example, brewing the hot coffee includes mixing the coffee grounds with the hot water at a ratio of ten to one of the hot water to the coffee grounds by weight.

In one example, rapidly cooling the filtered hot coffee to reduce the temperature of the filtered hot coffee to form the cooled coffee includes cooling the filtered hot coffee to a temperature no warmer than forty degrees Fahrenheit within a time period of no longer than fifteen minutes.

In one example, rapidly cooling the filtered hot coffee to reduce the temperature of the filtered hot coffee to form the cooled coffee includes cooling the filtered hot coffee from a temperature of at least 180 degrees Fahrenheit to the temperature that is no warmer than forty degrees Fahrenheit within the time period of no longer than fifteen minutes.

In one example, rapidly cooling the filtered hot coffee to reduce the temperature of the filtered hot coffee to form the cooled coffee includes cooling the filtered hot coffee to a temperature no warmer than forty degrees Fahrenheit within a time period of no longer than twenty minutes.

In one example, rapidly cooling the filtered hot coffee to reduce the temperature of the filtered hot coffee to form the cooled coffee includes cooling the filtered hot coffee from a temperature of at least 180 degrees Fahrenheit to the temperature that is no warmer than forty degrees Fahrenheit within the time period of no longer than twenty minutes.

In one example, brewing the hot coffee includes a multiple stage brewing process that includes an immersion brewing stage of the hot coffee and a pressure assisted drip brewing stage of the hot coffee.

In one example, the pressure assisted drip brewing stage occurs over a longer time period than the immersion brewing stage.

In one example, filtering the hot coffee includes passing the hot coffee through multiple filters that remove the at least some of the coffee grounds from the hot coffee.

In one example, brewing the hot coffee includes mixing the coffee grounds with the hot water in a brewing tank, and wherein filtering the hot coffee includes passing the hot coffee through a filter body disposed inside the brewing tank.

In one example, filtering the hot coffee includes additionally passing the hot coffee through an inline filter disposed in series with the filter body subsequent to the hot coffee being filtered by the filter body in the brewing tank.

In one example, brewing the hot coffee includes agitating a mixture of the coffee grounds and the hot water.

In one example, the method also includes mixing the cooled coffee with nitrogen gas.

In one example, the nitrogen gas is mixed with the cooled coffee at a pressure of at least forty-five pounds per square inch.

In one example, the cooled coffee is exposed to the nitrogen gas for at least twenty-four hours.

In one example, mixing the cooled coffee with the nitrogen gas occurs in presence of a carbonating stone.

In one example, the cooled coffee is exposed to the nitrogen gas in the presence of the carbonating stone for no more than six hours.

In one embodiment, a system (e.g., a brewing system) includes a brewing tank configured to receive coffee grounds and hot water (where the coffee grounds are mixed with the hot water at an elevated temperature to brew hot coffee, one or more filters configured to filter the hot coffee to remove at least some of the coffee grounds from the hot coffee to form filtered hot coffee, and a heat exchanger configured to rapidly cool the filtered hot coffee to reduce a temperature of the filtered hot coffee to form cooled coffee.

In one example, the brewing tank is a Lauter tun.

In one example, the brewing tank is configured to hold the coffee grounds with the hot water at a temperature above room temperature.

In one example, the brewing tank is configured to hold the coffee grounds with the hot water at a temperature of at least 180 degrees Fahrenheit.

In one example, the brewing tank is configured to hold the coffee grounds with the hot water at a temperature of at least 200 degrees Fahrenheit.

In one example, the brewing tank is configured to hold at least seventy-five gallons of the hot water.

In one example, the brewing tank is configured to hold at least 150 gallons of the hot water.

In one example, the brewing tank is configured to hold at least 1,500 gallons of the hot water.

In one example, the heat exchanger is configured to rapidly cool the filtered hot coffee to a temperature no warmer than forty degrees Fahrenheit within a time period of no longer than fifteen minutes.

In one example, the heat exchanger is configured to rapidly cool the filtered hot coffee to reduce the temperature of the filtered hot coffee from a temperature of at least 180 degrees Fahrenheit to the temperature that is no warmer than forty degrees Fahrenheit within the time period of no longer than fifteen minutes.

In one example, the heat exchanger is configured to rapidly cool the filtered hot coffee to a temperature no warmer than forty degrees Fahrenheit within a time period of no longer than twenty minutes.

In one example, the heat exchanger is configured to rapidly cool the filtered hot coffee to reduce the temperature of the filtered hot coffee from a temperature of at least 180 degrees Fahrenheit to the temperature that is no warmer than forty degrees Fahrenheit within the time period of no longer than twenty minutes.

In one example, the one or more filters include multiple filters that remove the at least some of the coffee grounds from the hot coffee.

In one example, the one or more filters include a filter body disposed inside the brewing tank.

In one example, the one or more filters also include an inline filter disposed in series with the filter body subsequent to the hot coffee being filtered by the filter body in the brewing tank.

In one example, the system also includes a storage tank in which the cooled coffee is mixed with nitrogen gas.

In one example, the storage tank includes a carbonating stone.

In one embodiment, a method includes brewing hot coffee by mixing coffee grounds with water at a temperature of at least 180 degrees Fahrenheit, filtering the hot coffee through multiple filters to remove at least some of the coffee grounds from the hot coffee to form filtered hot coffee, and cooling the filtered hot coffee from the temperature of at least 180 degrees Fahrenheit to a temperature no warmer than forty degrees Fahrenheit within a time period no longer than twenty minutes to form cooled coffee.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    brewing hot coffee at an elevated temperature by mixing coffee grounds with hot water in a brewing tank;
    filtering the hot coffee to remove at least some of the coffee grounds from the hot coffee to form filtered hot coffee; and
    rapidly cooling the filtered hot coffee with a plate heat exchanger having separate channels in which one or more of water or glycol is pumped to cool at least seventy-five gallons of the filtered hot coffee without diluting the filtered hot coffee to reduce a temperature of the filtered hot coffee by at least one hundred forty degrees within five minutes to form cooled coffee.

2. The method of claim 1, wherein brewing the hot coffee includes mixing the coffee grounds with the hot water at the elevated temperature that is above room temperature.

3. The method of claim 1, wherein brewing the hot coffee includes:
    adding a first portion of a total amount of the hot water to be used to produce the cooled coffee to the brewing tank;
    subsequently adding the coffee grounds to the brewing tank; and
    adding a remaining portion of the total amount of the hot water to be used to produce the cooled coffee to the brewing tank.

4. The method of claim 1, wherein rapidly cooling the filtered hot coffee to reduce temperature of the filtered hot coffee to form the cooled coffee includes cooling the filtered hot coffee from at least 180 degrees Fahrenheit to no warmer than forty degrees Fahrenheit.

5. The method of claim 1, wherein brewing the hot coffee includes a multiple stage brewing process that includes an immersion brewing stage of the hot coffee and a pressure assisted drip brewing stage of the hot coffee.

6. The method of claim 5, wherein the pressure assisted drip brewing stage occurs over a longer time period than the immersion brewing stage.

7. The method of claim 1, wherein brewing the hot coffee includes mixing the coffee grounds with the hot water in the brewing tank, and wherein filtering the hot coffee includes passing the hot coffee through a filter body disposed inside the brewing tank.

8. The method of claim 7, wherein filtering the hot coffee includes additionally passing the hot coffee through an inline filter disposed in series with the filter body subsequent to the hot coffee being filtered by the filter body in the brewing tank.

9. The method of claim 1, further comprising mixing the cooled coffee with nitrogen gas.

* * * * *